United States Patent [19]

Ishii et al.

[11] Patent Number: 5,111,511

[45] Date of Patent: May 5, 1992

[54] IMAGE MOTION VECTOR DETECTING APPARATUS

[75] Inventors: Hirofumi Ishii, Moriguchi; Atsushi Morimura, Nara, both of Japan

[73] Assignee: Matsushita Electric Industrial Co., Ltd., Osaka, Japan

[21] Appl. No.: 367,366

[22] Filed: Jun. 16, 1989

[30] Foreign Application Priority Data

Jun. 24, 1988 [JP] Japan .................................. 63-157146
Oct. 28, 1988 [JP] Japan .................................. 63-273563

[51] Int. Cl.⁵ .......................... G06K 9/00; H04N 7/18
[52] U.S. Cl. ........................................... 382/1; 358/105
[58] Field of Search ................... 382/1, 42; 358/105, 358/125, 126

[56] References Cited

U.S. PATENT DOCUMENTS

| | | | |
|---|---|---|---|
| 3,942,022 | 3/1976 | Stumpf et al. | 358/105 |
| 4,608,594 | 8/1986 | Nicholson | 358/105 |
| 4,626,891 | 12/1986 | Achiha | 358/105 |
| 4,864,398 | 9/1989 | Avis et al. | 358/105 |
| 4,884,136 | 11/1989 | Ninomiya et al. | 358/105 |

FOREIGN PATENT DOCUMENTS

0132832 2/1985 European Pat. Off. .
87/05769 9/1987 PCT Int'l Appl. .

*Primary Examiner*—Leo H. Boudreau
*Assistant Examiner*—Michael R. Cammarata
*Attorney, Agent, or Firm*—Stevens, Davis, Miller & Mosher

[57] ABSTRACT

An image motion vector detecting apparatus includes a low-pass filter having a non-zero impulse response for at least one of a delay of a predetermined interval LX in the horizontal direction and a delay of a predetermined interval LY in the vertical direction of input image signals, a memory for storing image signals corresponding to a plurality of representative points arranged at a predetermined horizontal direction interval LX and at a predetermined vertical direction interval LY within a motion vector detection area for input image signals of a given frame, a subtracter for obtaining differences between the stored image signals corresponding to each of the plurality of representative points and input image signals of frames subsequent to the given frame which input image signals correspond to points neighboring each of the plurality of representative point within the motion vector detection area, an adder which adds up the differences thus obtained, a unit for obtaining correlation values for shafts within the motion vector detection area, and a unit for determining a point providing a minimum value among the correlation values, estimating continuous correlation values by making linear interpolation using a correlation value between the minimum value point and four neighboring points in the horizontal direction and the vertical direction of the minimum value point, and detecting a motion vector by calculating a shift quantity which provides a minimum value among the estimated continuous correlation values.

5 Claims, 12 Drawing Sheets

$(i'-1, j')$ $(i', j')$ $(i'+1, j')$ $(i'-2, j')$ $(i', j')$ $(i'+2, j')$

IMAGE MOTION VECTOR DETECTING APPARATUS

BACKGROUND OF THE INVENTION

The present invention relates to a motion vector detecting apparatus for detecting a motion quantity of an image based on a moving image signal.

DESCRIPTION OF THE RELATED ART

As a method of detecting a motion quantity of an image based on a moving image signal, there is known a matching method using representative points. According to this method, there are provided a plurality of representative points in a motion vector detection area within the image frame. An absolute value of a difference between signals at the current and preceding fields within a detection region surrounding each representative point is calculated. The absolute values are accumulated with respect to each relative position of a representative point. A relative position which takes a minimum accumulated value is regarded as a motion vector. This matching method is also called a representative point matching method. FIG. 12 is a block diagram showing a motion vector detecting apparatus which uses the above-described representative point matching method. As shown in FIG. 12, the motion vector detecting apparatus is constructed by an image signal input terminal 1, a representative point memory 2, a subtracter 3, an absolute value converter 4, a cumulative adder 5, and a minimum value point detector 6. FIG. 11 is a schematic diagram showing representative points within an image frame and their detection regions, respectively used for the motion vector detecting apparatus shown in FIG. 12. In FIG. 11, each of reference numerals 7 and 7' represents a representative point, 8 and 8' an interval between representative points, 9 and 9' a magnitude of a detection region, and 10 and 10' a detection region represented by its representative point. FIGS. 10(a) and 10(b) are schematic diagrams each showing a table which stores therein cumulative values calculated by the cumulative adder 5 of the motion vector detecting apparatus shown in FIG. 12.

The operation of the motion vector detecting apparatus constructed as above will be described. Time sequential image signals for each field are applied to the image signal input terminal 1. In cooperative association with the representative point memory 2, a plurality of representative points 7, 7' are predefined within the detection area of the image frame as shown in FIG. 11. The representative point memory 2 is therefore adapted to store therein pixel signals of the inputted image signals at the representative points. Upon inputting of image signals of the next field, the subtracter 3 obtains a difference $\Delta L(i,j)$ between a pixel signal at a representative point at the preceding field and a pixel signal at the current field shifted by i in the horizontal direction and by j in the vertical direction from that representative point. Here, the i and are quantized values with a quantization interval of one pixel in the horizontal direction and one line in the vertical direction, respectively, within a detection range. The absolute value converter 4 converts the difference into an absolute value $|\Delta L(i,j)|$. The absolute value $|\Delta L(i,j)|$ for a signal difference with respect to a shift (i,j) is obtained for every representative point. The cumulative adder 5 cumulatively adds signals from the absolute value converter for each shift (i,j) and stores them in its table as shown in FIG. 10(a). Each cumulatively added value $\ominus|\Delta L(i,j)|$ is used as a correlation value for a shift (i,j). The minimum value point detector 6 detects a shift (i',j') which takes a minimum correlation value. The shift (i',j') is outputted as a motion vector.

The representative point matching method operating as above has the advantages that an operation of obtaining a correlation value by shifting one of the images between the preceding and current fields as in a fundamental matching method can be dispensed with, and that the amount of calculation can be reduced by decreasing the number of representative points. In addition, as shown in FIG. 11, the parallel processing for matching calculation can be dispensed with by setting the interval 8, 8' between representative points equal to the magnitude 9, 9' of a detection region so that the detection regions 10, 10' represented by respective representative points are not superposed one upon another. Further, by setting the detection regions represented by respective representative points so as to superpose one upon another to a limited degree, the amount of the parallel processing for the matching calculation can be made small, thereby allowing the motion vector detecting apparatus to be more readily achieved.

The image motion vector detection apparatus constructed as above, however, has the following problems.

First, since a correlation value is obtained by using only a pixel signal at the representative point, a reduction in the number of representative points results in a susceptibility to noise effects and a higher possibility of detecting an erroneous motion vector. In addition, there occurs often a case where a motion vector cannot be detected if the change of image signals is concentrated such as on an edge portion of a step waveform but it is small in the most area of the other image signal field. For this reason, the number of representative points cannot be reduced sufficiently in practice, still requiring a great amount of calculation and parallel processing. For the same reason, it is difficult to make the detection region large in such a motion vector detecting apparatus.

Furthermore, since a correlation value is calculated based on an absolute value of a difference between image signals, an erroneous vector is detected with a very large possibility if the reference level of an image signal varies between respective fields or if the contrast of image signals varies.

Still further, since correlation values are obtained for quantized shifts (i,j), and a shift, for which the smallest correlation value among the obtained correlation values has been obtained, is detected as a motion vector, it is not possible to detect a motion vector with precision higher than a quantization interval of each of the shifts for which correlation values are obtained.

SUMMARY OF THE INVENTION

The present invention has been made in consideration of the above problems. It is therefore an object of the present invention to provide an image motion vector detecting apparatus capable of stably detecting a motion vector irrespective of adverse effects of noises and the like, efficiently detecting a motion vector with a small amount of calculation, stably detecting a motion vector irrespective of a change in reference level of image signals and a change in contrast, and detecting a motion vector with precision higher than a conventional value.

Further according to the present invention, in order to achieve the objects of stably detecting a motion vector irrespective of adverse effects of noises and the like and efficiently detecting a motion vector with a small amount of calculation, among the above-described objects, there is provided at least a low-pass filter which suppresses a spatial high frequency component of an image signal in one or both of the horizontal and vertical directions. Thereafter, the image signal with its high frequency component being suppressed is used for matching purpose to thereby detect a motion vector.

With the above arrangement, the high frequency component of an image signal is suppressed so that the adverse effects by noises are suppressed during the matching operation. Therefore, a possibility of detecting an erroneous motion vector can be made vary small. In addition, even when a change in an image signal is concentrated such as on an edge portion of a step waveform, by virtue of the use of the low-pass filter, a waveform shown in FIG. 4(b), e.g., is changed to a waveform such as that shown in FIG. 4(d). Thus, the change component an image signal concentrated at an edge portion thereof can be extended or spread over a greater part of the other image area. Therefore, it becomes possible to detect a motion vector even with a less number of representative points so that the motion vector can be detected with a small amount of calculation, at high efficiency and high stability.

According to the present invention, to achieve the object of stably detecting a motion vector irrespective of a change in reference level of image signals and a change in contrast, among the above-described objects, there is provided at least a high-pass filter which suppresses a spatial low frequency component of an image signal in one or both of the horizontal and vertical directions, or two separate high-pass filters which suppress a spatial low frequency component of an image signal in the horizontal and vertical directions, respectively, the outputs of the two high-pass filters being added together. Thereafter, the image signal with its low frequency component being suppressed is used for matching purpose to thereby detect a motion vector.

Now, an image signal is considered from a spatial frequency component viewpoint. An error of a motion vector caused by a change in reference level of image signals or a change in contrast is proportional to the wavelength of a spatial frequency component signal. Therefore, in the above arrangement wherein the image signal with its low frequency component being suppressed by the high-pass filter is used for matching purpose to thereby detect a motion vector, it is possible to stably detect a motion vector within a predetermined error tolerance irrespective of a change in reference level of image signals and a change in contrast.

Furthermore, according to the present invention, to achieve the object of detecting a motion vector with precision higher than a conventional value, among the above-described objects, a correlation value is obtained through matching operation based on discrete shifts. Based on the obtained correlation values, a correlation value for continuous shifts is estimated by means of interpolation. A shift having a minimum correlation value is detected as a motion vector.

With the above-described arrangement, it becomes possible to detect a motion vector having precision higher than the interval of a discrete shift from which a correlation value is obtained through matching operation.

DESCRIPTION OF THE PREFERRED EMBODIMENTS

A first embodiment of an image motion vector detecting apparatus of this invention will be described with reference to the accompanying drawings.

Figure 1:
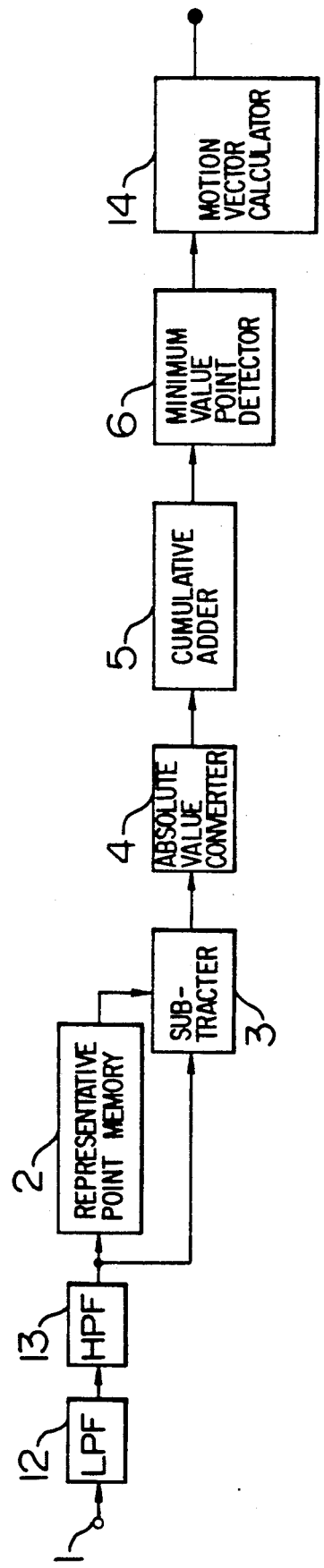
FIG. 1 is a block diagram showing the outline of a first embodiment of an image motion vector detecting apparatus according to the present invention.

FIG. 1 is a block diagram showing the image motion vector detecting apparatus of the first embodiment. As shown in FIG. 1, the motion vector detecting apparatus is constructed by an image signal input terminal 1, a low-pass filter 12, a high-pass filter 13, a representative point memory 2, a subtracter 3, an absolute value converter 4, a cumulative adder 5, a minimum value point detector 6, and a motion vector calculator 14.

In the operation thereof, time sequential image signals for each field are applied to the image signal input terminal 1. An image signal is an 8 bit digital signal obtained by sampling an NTSC signal at a frequency of 4×Fsc (Fsc=3.58 MHz). The low-pass filter 12 cuts the high frequency component of an inputted image signal in the horizontal and vertical directions in accordance with the following transfer function:

$$H(\omega,z) = \frac{1}{16 - 15 \times z^{-1}} \times \frac{1}{8 - 7 \times \omega^{-1}}$$

In the above function, z and ω represent one pixel delay in the horizontal direction and one line delay in the vertical direction, respectively. The above function is constructed by an infinite impulse response low-pass filter which can be fabricated with a simpler circuitry than a finite impulse response low-pass filter having a similar cut-off frequency. In order to detect a motion vector with high precision, the calculation is conducted on the 16 bit unit basis including 8 bits under the decimal point, and the output signal is a 10 bit signal including 2 bits under the decimal point.

The high-pass filter 13 cuts the low frequency component of a signal outputted from the low-pass filter 12 in accordance with the following transfer function. This high-pass filter 13 is constructed by two separate high-pass filters which suppress the high frequency component of the signal in the horizontal and vertical directions, respectively, the outputs of the two high-pass filters being added together as follows.

$$H(\omega, z) = (1 - z^{-16}) + (1 - \omega^{-8})$$

Figure 2A:
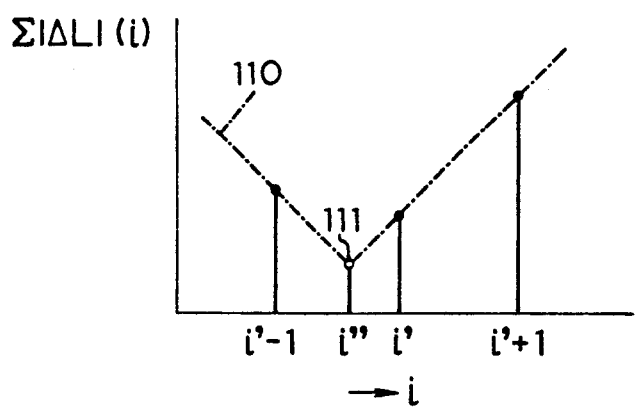
FIGS. 2(a) and 2(b) are explanatory diagrams used for explaining the operation of the embodiment.
Figure 2B:
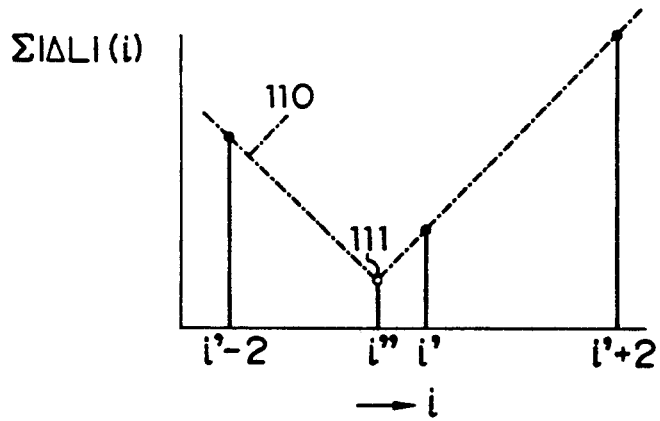
Figure 10A:
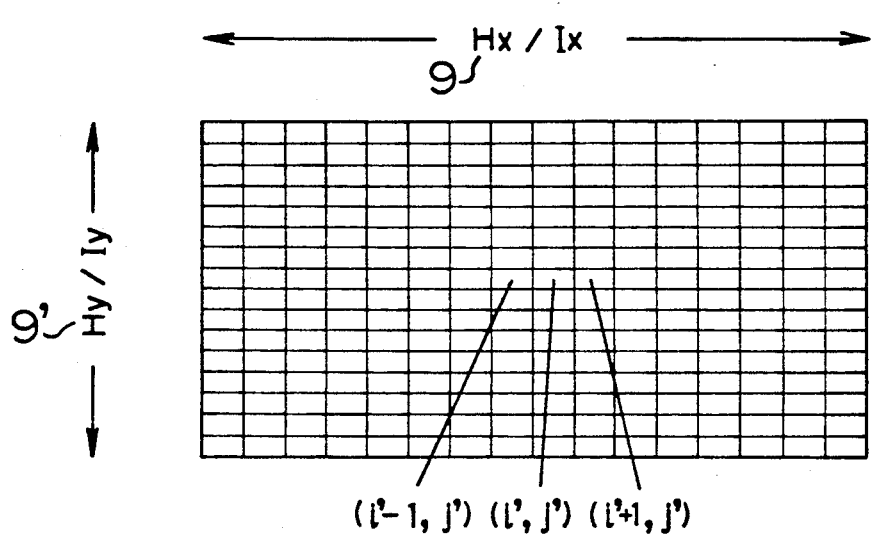
FIGS. 10(a) and 10(b) and FIG. 11 are explanatory diagrams used for explaining the operation of the embodiments of this invention and a conventional apparatus.
Figure 11:
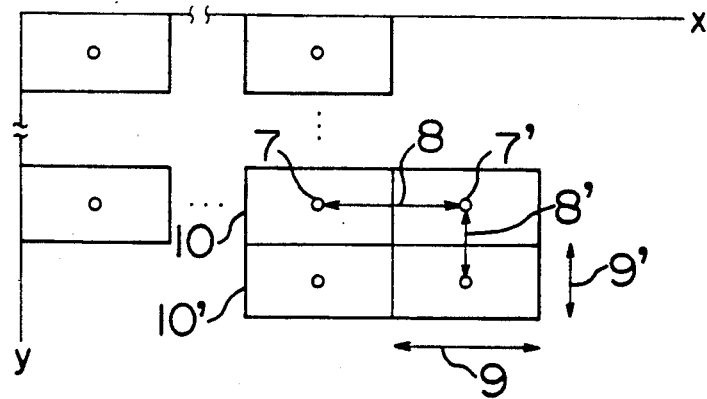
Figure 12:
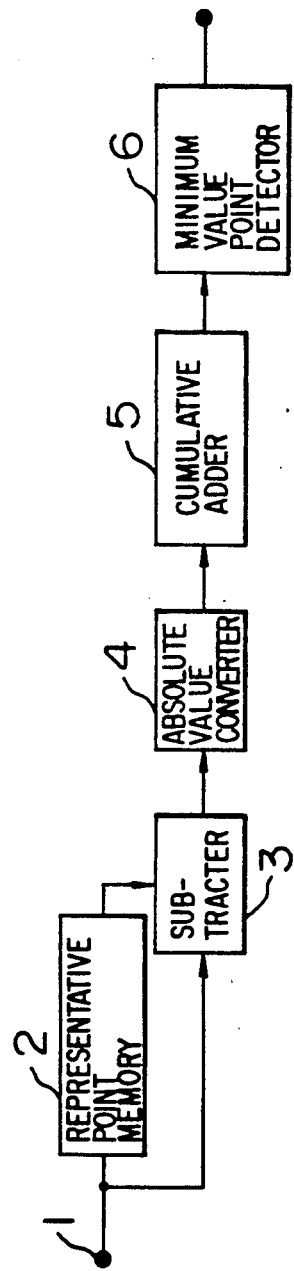
FIG. 12 is a block diagram showing the outline of a conventional image motion vector detecting apparatus.

In cooperative association with the representative point memory 2, a plurality of representative points 7, 7' are predefined within the detection area of the image frame as shown in FIG. 11. The representative point memory 2 is therefore adapted to store therein pixel signals of the inputted image signals at the representative points. Upon input of image signals of the next field, the subtracter 3 obtains a difference $\Delta L(i,j)$ between a pixel signal at a representative point at the preceding field and a pixel signal at the current field shifted by IX in the horizontal direction and by IY in the vertical direction from that representative point. The IX and IY are assumed here one pixel interval and one line interval, respectively. The absolute value converter 4 converts the difference into an absolute value $|\Delta L(i,j)|$. The cumulative adder 5 cumulatively adds signals from the absolute value converter for each shift (i,j) and stores them in its table as shown in FIG. 10(a). Each cumulatively added value $|\Delta L(i,j)|$ is used as a correlation value for a shift (i,j). The minimum value point detector 6 detects a minimum value point ((i'', j'')) which takes a minimum correlation value. The minimum correlation value and neighbouring correlation values for shifts (i'−1, j'), (i'+1, j'), (i', j'−1), and (i', j'+1) are outputted to the motion vector calculator 14. Using the inputted correlation values, the motion vector calculator 14 interpolates the correlation values by using a function 110 (as shown in FIG. 2b). The minimum value point (i'', j'') 111 of the interpolated correlation value is obtained using the following formulas and outputted as a motion vector.

$$i'' = i' + dx$$
and
$$dx = IX/2 \times (a - b)/\max(a,b)$$
Here
$$IX = 1$$
substituting we have
$$i'' = i' + 0.5 \times (a - b)/\max(a,b)$$
$$j'' = j' + dy$$
and
$$dy = IY/2 \times (c - d)/\max(c,d)$$
Here
$$IY = 1$$
substituting we have
$$j'' = j' + 0.5 \times (c - d)/\max(c,d)$$
where
$$a = \Sigma|\Delta L(i'-1, j')| - \Sigma|\Delta L(i',j')|$$
$$b = \Sigma|\Delta L(i'+1, j')| - \Sigma|\Delta L(i',j')|$$
$$c = \Sigma|\Delta L(i', j'-1)| - \Sigma|\Delta L(i',j')|$$
$$d = \Sigma|\Delta L(i', j'+1)| - \Sigma|\Delta L(i',j')|$$

and max (a, b) denotes an operation of obtaining a maximum value between a and b.

With the above arrangement, the high frequency component of an image signal is suppressed so that the adverse effects by noises are suppressed during the matching operation. Therefore, a possibility of detecting an erroneous motion vector can be made vary small. In addition, even when a change in an image signal is concentrated such as on an edge portion of a step waveform, by virtue of the use of the low-pass filter, in a waveform as in FIG. 4(b), e.g., is changed to one as in FIG. 4(d). Thus, the change component of an image signal concentrated at an edge portion thereof can be extended or spread over a greater part of the other image area. Therefore, it becomes possible to detect a motion vector even with representative points disposed at longer intervals so that the motion vector can be detected with a small amount of calculation, with high efficiency and high stability.

Figure 3A:
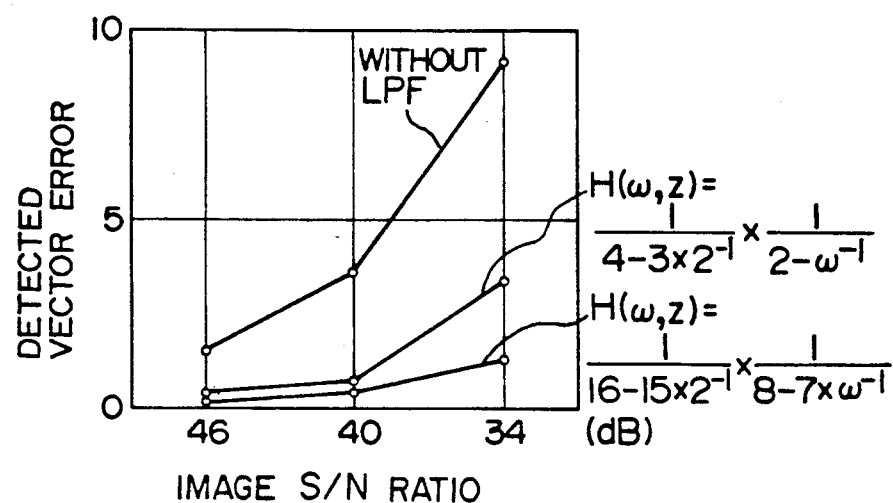
FIGS. 3(a), 3(b) and 3(c) are graphs used for explaining the advantages of the embodiment.
Figure 3B:
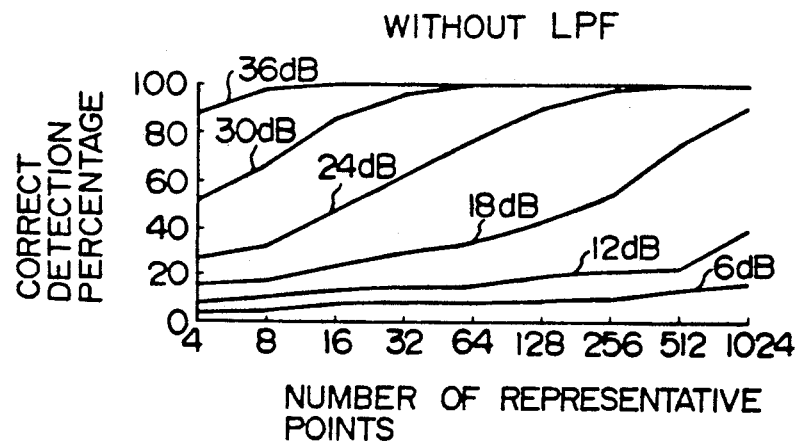
Figure 3C:
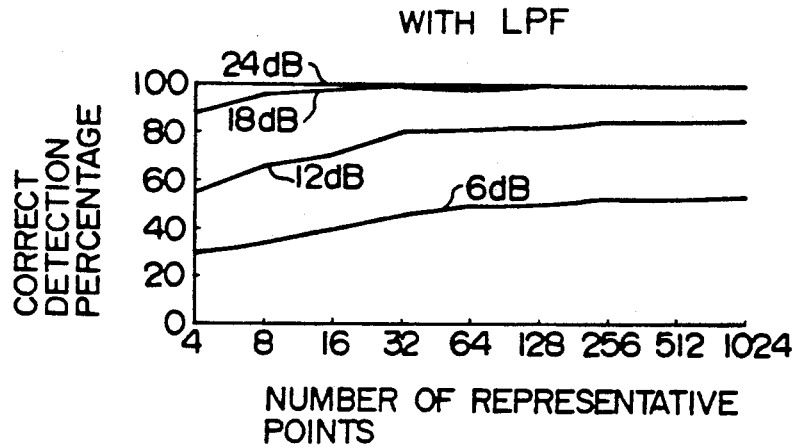

FIGS. 3(a) to 3(c) are graphs showing the experimental results for confirming the advantages of suppressing the high frequency component in detecting a motion vector for a noisy image. In FIGS. 3(a), the abscissa represents an image S/N, and the ordinate represents an average error value of detected motion vectors. FIG. 3(a) shows the resultant average error values obtained with and without a low-pass filter of the embodiment, and obtained with a low-pass filter having an intermediate characteristic as expressed by the following transfer function:

$$H(\omega,z) = \frac{1}{4 - 3 \times z^{-1}} \times \frac{1}{2 - \omega^{-1}}$$

As is apparent from FIG. 3(a), it can be understood that a motion vector can be detected with higher precision if a low-pass filter is used. Each of FIGS. 3(b) and 3(c) show the correct detection percentage of an image motion vector versus the number of representative points using an image S/N as the parameter, respectively for the cases without any low-pass filter and provided with the low-pass filter (LPF) of this embodiment. As is apparent from FIGS. 3(b) and 3(c), it can also be understood that a motion vector can be detected with a less number of representative points and with high stability against noises if the low-pass filter is used.

Figure 4A:
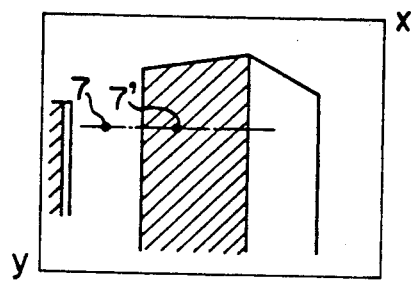
FIGS. 4(a) to 4(e) and FIGS. 5(a) to 5(d) are explanatory diagrams used for explaining the operation of the embodiment.
Figure 4B:
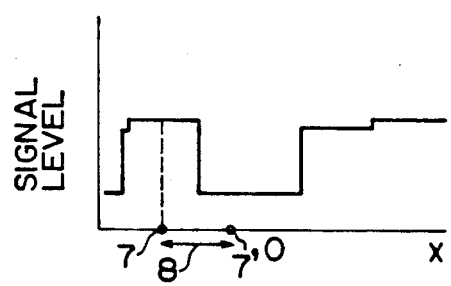
Figure 4C:
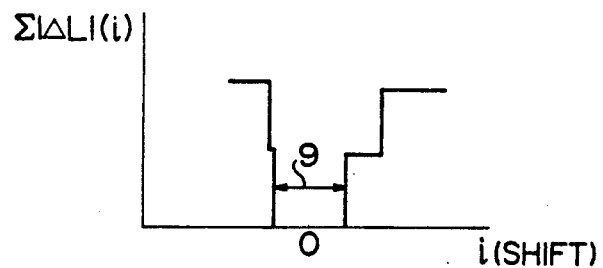
Figure 4D:
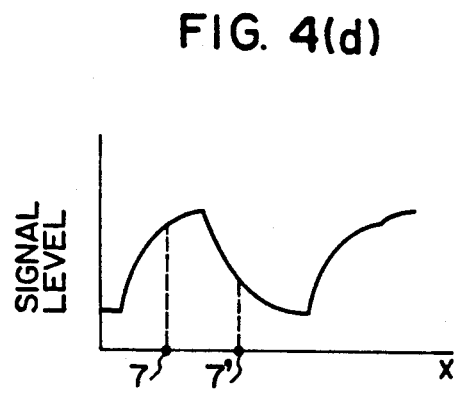
Figure 4E:
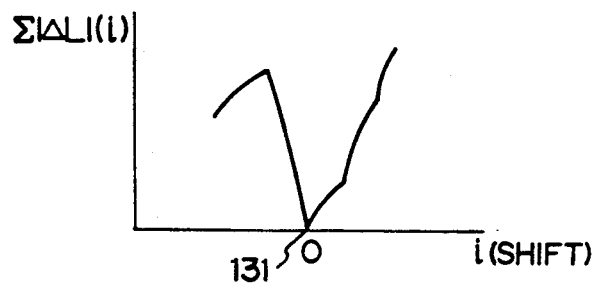

FIGS. 4(a) to 4(e) are explanatory diagrams illustrating the operation of the embodiment wherein a change of an image signal having such as a step waveform is concentrated on its edge portion. FIG. 4(a) illustrates an example of the image for an image signal of a step waveform, wherein each of reference numerals 7 and 7' represent a representative point. FIG. 4(b) shows an image signal on a horizontal scan line passing through the representative points 7 and 7', wherein reference numeral 8 represents an interval between the representative points. If a matching operation is performed, in a conventional manner, between such image signal waveforms, based on the sampled values at the representative points 7 and 7', the resultant correlation values become as shown in FIG. 4(c). The portion indicated at 9 in FIG. 4(c) where the correlation value is minimum, has substantially the same length as the interval 8 between the representative points shown in FIG. 4(b). Therefore, a motion vector cannot be detected. However, by using the low-pass filter of this embodiment, the waveform shown in FIG. 4(b) is transformed as shown in FIG. 4(d) so that the varying components of the image signal concentrating on the edge portion can be extended onto a greater part of the other image area. If a matching operation is performed between such image signal waveforms, based on the sampled values at the representative points 7 and 7' as shown in FIG. 4(d), the resultant correlation values become as shown in FIG. 4(e). A motion vector can be detected correctly with a very small number of representative points by obtaining a minimum value point 131 of the correlation values.

In the above arrangement wherein the image signal with its d.c. and low frequency components being suppressed by the high-pass filter is used for the matching purpose to thereby detect a motion vector, it is possible to stably detect a motion vector within a predetermined error tolerance irrespective of a change in reference level of image signals and a change in contrast.

Figure 5A:
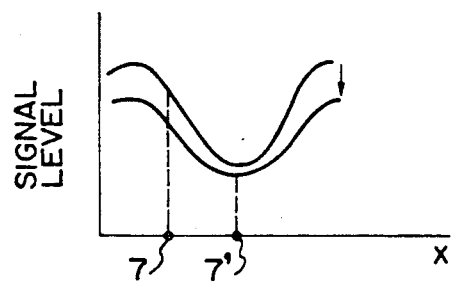
Figure 5B:
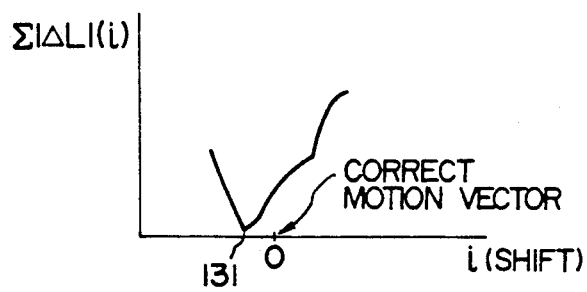
Figure 5C:
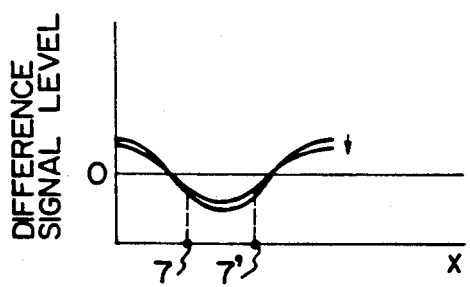
Figure 5D:
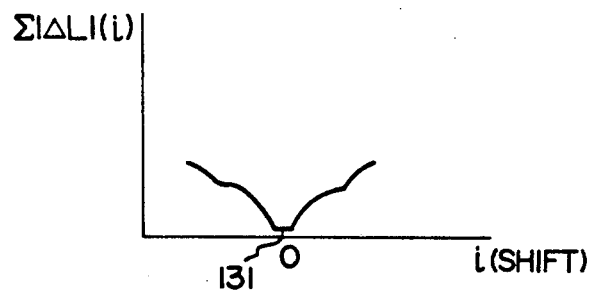

FIGS. 5(a) to 5(d) are explanatory diagrams used for explaining the operation of the embodiment wherein the gain for an image signal varies. FIG. 5(a) shows an variation in gain of an image signal, wherein reference numeral 7 and 7' represent representative points. If a matching operation is performed, in a conventional manner, between such gain varying image signal waveforms, based on the sampled values at the representative points 7 and 7', the resultant correlation values become as shown in FIG. 5(b). Since the waveform shown in FIG. 5(a) does not shift in the horizontal direction, a correct motion vector is a zero vector. However, a minimum point of the correlation value is present in the obtained correlation values as shown at 131 in FIG. 5(b), resulting in an erroneous image motion vector. However, in the embodiment using the high-pass filter, the waveform shown in FIG. 5(a) is transformed as shown in FIG. 5(c). Therefore, if a matching operation is performed between such gain changed image signal waveforms, based on the sampled values at the representative points 7 and 7', the resultant correlation values become as shown in FIG. 5(d). A generally correct motion vector can thus be detected by obtaining a minimum value point of the correlation value.

Figure 6:
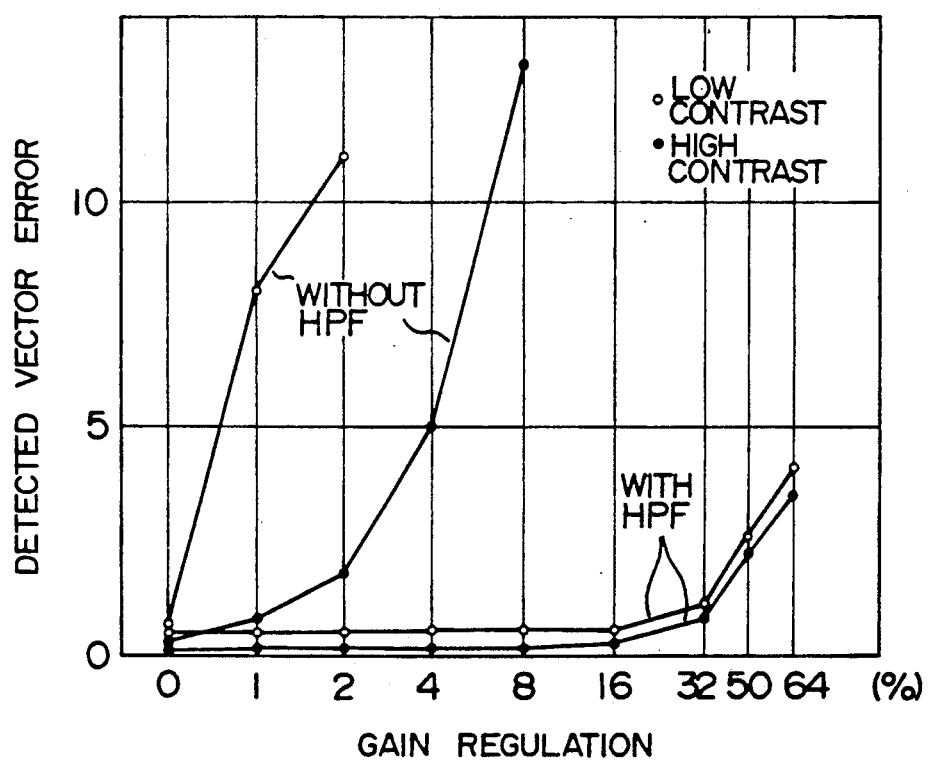
FIG. 6 is a graph used for explaining the advantages of the embodiment.

FIG. 6 is a graph showing an experimental result for confirming the advantages of suppressing a low frequency component in detecting a motion vector for gain varying images. In FIG. 6, the abscissa represents the gain regulation of images between fields and the ordinate represents average error values of detected motion vectors, respectively, for both images having high contrast and low contrast. FIG. 6 also shows a comparison between the cases with and without the high-pass filter as described in the embodiment. As is apparent from FIG. 6, a motion vector can be detected at higher precision and higher stability against gain variations, when the high-pass filter is used.

Variations in gain, reference level and contrast of image signals are often caused by a change in the aperture of an image pickup camera, a change in gain of a signal processing system, a change of illumination, flicker or the like. Even under these circumstances, the present invention enables stable and precise detection of an image motion vector.

Figure 7A:
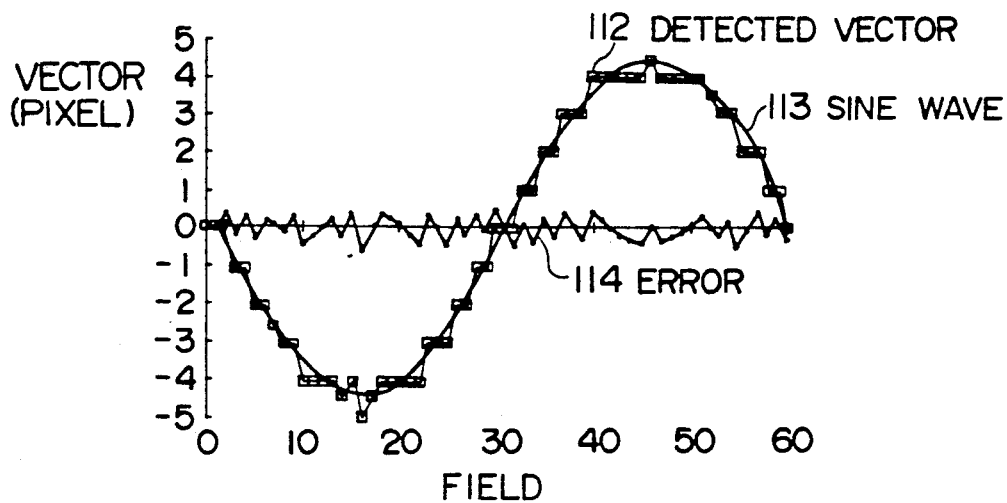
FIGS. 7(a), 7(b) and 7(c) are graphs used for explaining the advantages of the first and second embodiments.
Figure 7B:
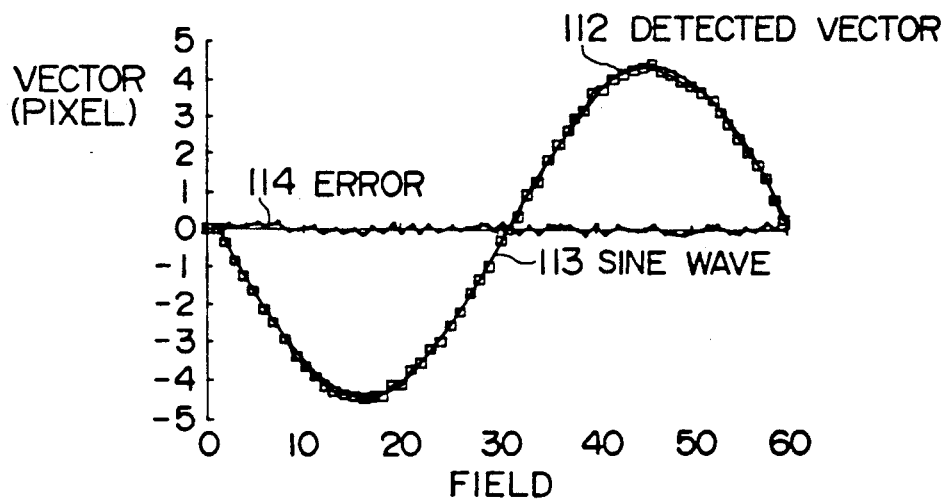
Figure 7C:
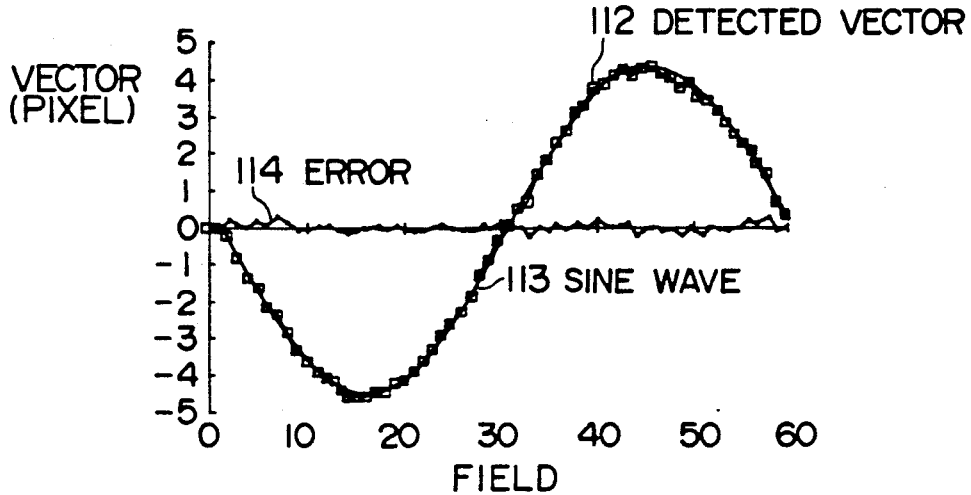

In the above arrangement wherein a correlation value is obtained through the matching operation based on discrete shifts, based on the obtained correlation value having a minimum correlation value and neighbouring correlation values, a correlation value for consecutive shifts is estimated by means of interpolation. And, a shift having a minimum correlation value is detected as a motion vector. Therefore, it becomes possible to detect a motion vector having precision higher than the interval of a discrete shift from which a correlation value is obtained through the matching operation. Figs. 7(a) and 7(b) show the result of simulation for confirming the advantage of such detection. In obtaining the result shown in FIGS. 7(a) and 7(b), the optical axis of a camera was swung sinusoidally to pick up an image signal representing a swinging image and to detect a motion vector. The result according to a conventional example is shown in FIG. 7(a), and the result according to the present embodiment is shown in FIG. 7(b). In this case, four detection regions were prepared within an image frame to detect motion vectors for respective detection regions, and the average value of the four motion vectors excepting the maximum and minimum values thereof was calculated both in the horizontal and vertical directions to use it as a motion vector for the whole image frame. In FIGS. 7(a) to 7(c), reference numeral 112 represents a detected motion vector, 113 a sine wave representing a fluctuating image, and 114 a detected error. As is apparent from the results shown in FIGS. 7(a) and 7(b), it can be understood that, according to the present embodiment, an image motion vector can be detected with higher precision than conventional precision.

A second embodiment of an image motion vector detecting apparatus of this invention will be described with reference to the accompanying drawings.

Figure 8:
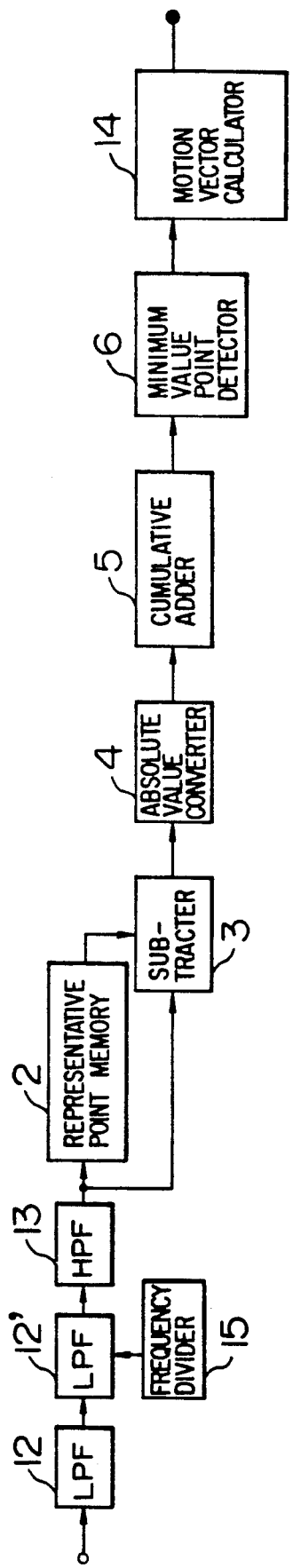
FIG. 8 is a block diagram showing the outline of a second embodiment of the image motion vector detecting apparatus according to the present invention.

FIG. 8 is a block diagram showing the image motion vector detecting apparatus of the second embodiment. As shown in FIG. 8, the motion vector detecting apparatus is constructed by an image signal input terminal 1, a frequency divider 15, low-pass filters 12 and 12', a high-pass filter 13, a representative point memory 2, a subtracter 3, an absolute value converter 4, a cumulative adder 5, a minimum value point detector 6, and a motion vector calculator 14.

In operation, time sequential image signals for each field are applied to the image signal input terminal 1. An image signal is an 8 bit digital signal obtained by sampling an NTSC signal at a frequency of 4×Fsc (Fsc=3.58 MHz). The low-pass filter 12 cuts the high frequency component of an inputted image signal in the horizontal direction in accordance with the following transfer function:

$$H(\omega, z) = \frac{1}{16 - 15 \times z^{-1}}$$

The low-pass filter 12' removes the odd number signal of an inputted signal at the sampling frequency of 4×Fsc, with the aid of the frequency divider 15, to thereby obtain a signal having a frequency of 2×Fsc. The high frequency component of the obtained signal is cut in the vertical direction in accordance with the following transfer function:

$$H(\omega, z) = \frac{1}{8 - 7 \times \omega^{-1}}$$

In the above function, z and ω represent one pixel delay in the horizontal direction and one line delay in the vertical direction, respectively. The above function is constructed by an infinite impulse response low-pass filter which can be fabricated with a simpler circuitry than a finite impulse response low-pass filter having a similar cut-off frequency. In addition, the capacity of a line memory required by the low-pass filter 12' for the vertical direction can be halved, because the frequency of the signal is made 2×Fsc by using the frequency divider 15. In order to detect a motion vector with high precision, the calculation is conducted on the 16 bit unit basis including 8 bits under the decimal point, and the output signal is of a 10 bit signal including 2 bits under the decimal point.

The high-pass filter 13 cuts the low frequency component of a signal outputted from the low-pass filter 12' in accordance with the following transfer function. This high-pass filter 13 is constructed by two separate high-pass filters which suppress the high frequency component of the signal in the horizontal and vertical directions, respectively, the outputs of the two high-pass filters being added together.

$$H(\omega, z) = (1 - z^{-16}) + (1 - \omega^{-8})$$

Figure 10B:
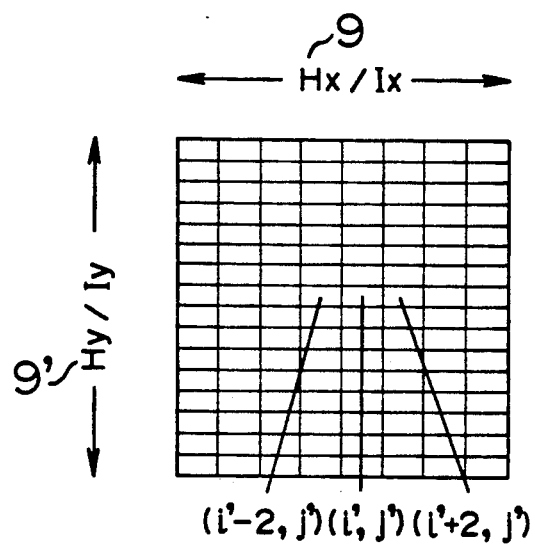

In cooperative association with the representative point memory 2, a plurality of representative points 7, 7' are predefined within the detection area of the image frame as shown in FIG. 11. The representative point memory 2 is therefore adapted to store therein pixel signals of the inputted image signals at the positions of the representative points. Upon inputting of image signals of the next frame, the subtracter 3 obtains a difference $\Delta L(i,j)$ between a stored pixel signal at the position of a representative point in the preceding field and a pixel signal in the current field shifted by IX in the horizontal direction and by IY in the vertical direction from the preceding field representative point. The IX and IY are assumed here two pixel interval and one line interval, respectively. The absolute value converter 4 converts the difference into an absolute value $|\Delta L(i,j)|$. The cumulative adder 5 cumulatively adds signals from the absolute value converter at every shift (i,j) and stores them in a table, which is provided in the cumulative adder 5 and which corresponds to respective shifts (i,j), as shown in FIG. 10(b). Each cumulatively added value $|\Delta L(i,j)|$ is used as a correlation value for a shift (i,j). As shown in FIG. 10(b), the memory capacity of the table for respective shifts (i,j) is also halved as compared with the conventional memory capacity shown FIG. 10(a). The minimum value point detector 6 detects a shift (i',j') which takes a minimum correlation value. The minimum correlation value and neighbouring correlation values for the shifts (i'−2, j'), (i'+2, j'), (i',j'−1), and (i',j'+1) are outputted to the motion vector calculator 14. Using the inputted correlation values, the motion vector calculator 14 interpolates the correlation values by using a function 110 as shown in FIG. 2(b). The minimum value point (i", j") 111 of the interpolated correlation value is obtained using the following formulas and outputted as a motion vector.

$$i'' = i' + dx$$
and
$$dx = IX/2 \times (a - b)/\max(a,b)$$
Here
$$IX = 2$$
substituting we have
$$i'' = i' + 1.0 \times (a - b)/\max(a,b)$$
$$j'' = j' + dy$$
and
$$dy = IY/2 \times (c - d)/\max(c,d)$$
Here
$$IY = 1$$
substituting we have
$$j'' = j' + 0.5 \times (c - d)/\max(c,d)$$
where
$$a = \Sigma|\Delta L(i'-2,j')| - \Sigma|\Delta L(i',j')|$$
$$b = \Sigma|\Delta L(i'+2,j')| - \Sigma|\Delta L(i',j')|$$
$$c = \Sigma|\Delta L(i',j'-1)| - \Sigma|\Delta L(i',j')|$$
$$d = \Sigma|\Delta L(i',j'+1)| - \Sigma|\Delta L(i',j')|$$

and max (a, b) denotes an operation of obtaining a maximum value between a and b.

With the above arrangement, the high frequency component of an image signal is suppressed in the horizontal direction, and thereafter, the frequency is changed from 4×Fsc to 2×Fsc by using the frequency divider 15. Therefore, the amount of calculation is approximately halved. The capacity of the line memory for the low-pass filter 12', the memory capacity of the table in the cumulative adder 5, and the like can also be halved to accordingly realize the motion vector detecting apparatus with a simpler circuitry. In addition, the operation speed required for the circuits from the low-pass filter 12' to the minimum value point detector 6 is halved, thus making it possible to realize the apparatus more easily.

In the above arrangement, the motion vector calculator 14 estimates a correlation value for continuous shifts by means of interpolation based on a minimum correlation value and neighbouring correlation values, and a shift having a minimum estimated correlation value is calculated to detect it as a motion vector. Therefore, it becomes possible to detect a motion vector having higher precision than a conventional value, even if the interval for obtaining correlation values is made to be two pixels in the horizontal direction. FIGS. 7(a) and 7(c) show the result of simulation for confirming the advantage of such detection. In obtaining the result shown in FIGS. 7(a) and 7(c), the optical axis of a camera was swung sinusoidally to pick up an image signal representing a swinging image and to detect a motion vector. The result according to a conventional example is shown in FIG. 7(a), and the result according to the present embodiment is shown in FIG. 7(c). In this case, four detection regions were prepared within an image frame to detect motion vectors for respective detection regions, and the average value of the four motion vectors excepting the maximum and minimum values thereof was calculated both in the horizontal and vertical directions to use it as a motion vector for the whole image frame. As is apparent from the results shown in FIGS. 7(a) and 7(c), it can be understood that according to the present embodiment, an image motion vector can be detected at higher precision and with a smaller detected error 114 than conventional values, irrespective of the fact that the interval for obtaining correlation values is made two pixels in the horizontal direction.

Figure 9A:
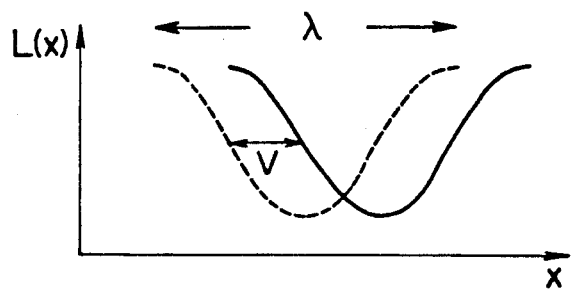
FIGS. 9(a), 9(b) and 9(c) are explanatory diagrams used for explaining the operation of the embodiment.
Figure 9B:
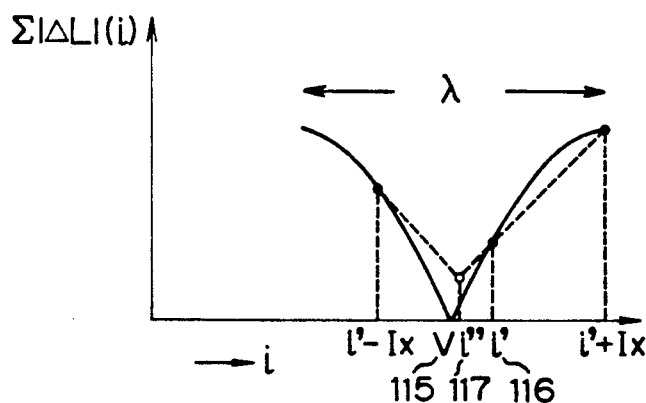
Figure 9C:
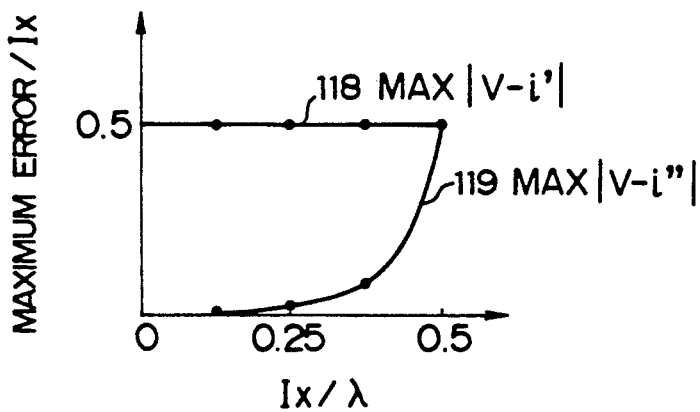

The low-pass filters 12 and 12' used in the first and second embodiments of this invention have the advantage of not only suppressing the adverse effects of noises but also making small the error of a calculated motion vector. FIGS. 9(a) to 9(c) are explanatory diagrams used for explaining the advantage of the present invention. In FIG. 9(a), it is assumed that an inputted image signal is a sine wave having a wavelength of λ. FIG. 9(b) shows a relationship between the shift (i) and the correlation value $\Sigma|\Delta L|$ (i) of the inputted image signals with respective to continuous values of i. In FIG. 9(b), reference numeral 115 represents an image motion vector v, 116 a detected motion vector i' according to a conventional example with the interval for obtaining correlation values being set at Ix, and 117 a detected motion vector i" according to the present embodiment. FIG. 9(c) shows a relationship between the maximum detection errors (max $|v-i'|$) 118 and (max $|v-i''|$) 119, respectively, of the conventional example and the present embodiment, the interval Ix, and the wavelength λ. As seen from FIG. 9(c), the maximum detection error of this embodiment becomes larger as the value (Ix/λ) becomes larger. At λ=2×Ix, the maximum detection error of this embodiment becomes equal to the maximum detection error in the conventional example. An image signal contains in practice various wavelength components, particularly middle and low frequency components. Therefore, even if the low-pass filter is not used, the present embodiments can detect a motion vector with precision higher than a conventional value. However, a motion vector can be more stably detected if the low-pass filter is used to suppress the high frequency component of an inputted image signal in the horizontal direction, particularly the high frequency component near the frequency $F = 1/(2 \times Ix)$. Similarly, as to the vertical direction, a motion vector can be detected with higher precision by suppressing the high frequency component, particularly the high frequency component near and higher than the frequency $F = 1/(2 \times Iy)$, with the interval for obtaining correlation values being set at Iy.

In the second embodiment, the interval for obtaining correlation values has been set as two pixels in the horizontal direction and one line in the vertical direction. The interval may take any other value. For instance, the interval for obtaining correlation values may be set to be four pixels in the horizontal direction and one line in the vertical direction, or to be two pixels in the horizontal direction and two lines in the vertical direction.

In the second embodiment, the data amount of image signals is halved at the low-pass filter 12' with the aid of the frequency divider 15. This process may be carried out at the different stage. For instance, the data amount may be halved with a trap or the like, immediately after image signals are inputted. Alternatively, the data amount may be halved at the stage where a difference between image signals is obtained at the subtracter 3, by using a frequency divider or the like.

In the first and second embodiments, although the representative point matching method is used for obtaining a correlation value, a whole point matching method may be used. Also in the first and second embodiments, although the subtracter 3 and absolute value converter 4 are used for obtaining an absolute value $|\Delta L|$ of a difference between two signals, a multiplier may be used for obtaining a product of two signals. In this case, a maximum value point detector is used instead of the minimum value point detector 6, and the motion vector calculator 14 obtains a maximum value point of an upward projecting virtual function, instead of a minimum value point of a downward projecting virtual function as shown in FIGS. 2(a) and 2(b). Further in the first and second embodiments, although the motion vector calculator 14 obtains a minimum value point of the function as shown in FIGS. 2(a) and 2(b), another function such as a second-order function may be used. The motion vector calculator 14 may be adapted to compensate a motion vector for a certain amount in the direction from an optimum point to a point having a value near the optimum point among the points around the optimum point, instead of obtaining a minimum or maximum point of a virtual function. In the first and second embodiments, although the motion vector calculator 14 calculates a motion vector using only the minimum point value and four neighbouring point values, other point values may be used instead. For instance, obliquely disposed four points adjacent to the minimum point may be used, or the four neighbouring points and obliquely disposed four points, that is, eight points in total and the minimum point may be used, or the points in a broader range about the minimum point may also be used. In the second embodiment, the interval for obtaining correlation values are set to be two pixels in the horizontal direction and one line in the vertical direction. However, the interval may be set to be any other combination of values. For instance, the interval may be set to be two pixels in the horizontal direction and two lines in the vertical direction, four pixels in the horizontal direction and two lines in the vertical direction, and on on. In the first and second embodiments, the interval for obtaining correlation values is set to be a constant value. However, this interval is not necessarily required to be set to have a constant value. For instance, the interval may be made shorter in a certain portion within a detection area for a motion vector, and made longer in the other portion. This invention is also applicable to such a case having different intervals.

In the first and second embodiments of this invention, an image signal is used which is an 8 bit digital signal obtained by sampling an NTSC signal having a frequency of $4 \times Fsc$ (Fsc = 3.58 MHz). It is apparent that the present invention is also effective even if a signal having a different sampling frequency or a different bit number, or a moving image signal other than an NTSC signal is used. Further, in the first and second embodiments of this invention, a motion vector for time sequentially consecutive fields is detected. However, a motion vector of images at two fields which are spaced apart by several fields may be detected.

In the first and second embodiments of this invention, a combination of the low-pass filter 12, high-pass filter 13 and motion vector calculator 14 is used. Obviously, these circuits may be used independently or in any desired combination, while retaining their respective advantages. The characteristics of these filters 12 and 13 may have other characteristics different from those shown in the embodiments. For instance, the characteristic of the low-pass filter 12 expressed by the following function may also be used:

$$H(\omega,z) = (1 + z^{-1} + z^{-2} + z^{-3} + z^{-4} + z^{-5} + z^{-6} + z^{-7}) \times \left(\frac{1}{8 - 7 \times \omega^{-1}}\right)$$

Also, the characteristic of the high-pass filter 13 expressed by the following function which suppresses the d.c. and high frequency components in the horizontal direction may also be used:

$$H(\omega, z) = 1 - z^{-16}$$

Further, in the first and second embodiments of this invention, the low-pass filter 12 and high-pass filter 13 are used separately. It is apparent that the same advantages can be obtained even if a band-pass filter having the characteristics of the low-pass and high-pass filters in combination is used. Furthermore, the characteristics of the filters are not necessary to be strictly the same as those described in the embodiments. For instance, an optimum filter characteristic may be set depending upon the sampling frequency of an image signal, the S/N, desired detection precision, or the like.

The same advantages of this invention can be obtained either in the case where the motion vector detecting apparatus is realized using discrete circuits or in the case where the image processing is performed with software using a computer to detect a motion vector.

The advantages obtained by the present invention are as follows.

As described so far, the present invention can easily realize an image motion vector detecting apparatus with a simple circuitry. Further, in the case where the image processing is performed with software using a computer to detect a motion vector, the amount of calculation can be reduced, and a motion vector can be efficiently detected. Furthermore, a precise motion vector can be stably detected irrespective of noises, a change in reference level of image signals, and a change in contrast, with precision higher than a conventional value. Therefore, an image motion vector detecting apparatus for various video apparatuses becomes available with high reliability and high precision and at low cost.

We claim:

1. A motion vector detecting apparatus comprising:
   a low-pass filter means for receiving and filtering input image signals;
   a representative point memory means, receiving an output of said low-pass filter means, for storing image signals corresponding to a plurality of representative points arranged within a motion vector detection area for input image signals of a given frame, said representative points being arranged at a predetermined horizontal direction interval LX and at a predetermined vertical direction interval LY;
   a subtraction means, receiving stored image signals from said representative point memory means and the input image signals, for obtaining differences between (i) stored image signals stored in said representative point memory means corresponding to each of said plurality of representative points and (ii) input image signals of frames subsequent to the given frame, said subsequent input image signals corresponding to points neighboring each of said plurality of representative points within the motion vector detection area;
   a cumulative addition means, responsive to said subtraction means, for adding up the differences obtained by said subtraction means;
   a means for obtaining correlation values for shifts within the motion vector detection area based on said differences added up by said cumulative addition means;
   a motion vector outputting means, responsive to said correlation values obtaining means, for determining a point constituting a minimum value among said correlation values and outputting the minimum value point as a motion vector; and
   wherein said low-pass filter means has a non-zero impulse response for at least one of a delay of said predetermined horizontal direction interval LX and a delay of said predetermined vertical direction interval LY with respect to said input image signals.

2. A motion vector detecting apparatus according to claim 1, further comprising a high-pass filter means interconnected between said low-pass filter means and said representative point memory means, said high-pass filter means suppressing a DC component and a low frequency component at least in one of the horizontal direction and the vertical direction of the input image signals.

3. A motion vector detecting apparatus comprising:
   a low-pass filter means for receiving and filtering input image signals;
   a representative point memory means, receiving an output of said low-pass filter means, for storing image signals corresponding to a plurality of representative points arranged within a motion vector detection area for input image signals of a given frame, said representative points being arranged at a predetermined horizontal direction interval LX and at a predetermined vertical direction interval LY;
   a subtraction means, receiving stored image signals from said representative point memory means and the input image signals, for obtaining differences between (i) stored image signals stored in said representative point memory means corresponding to each of said plurality of representative points and (ii) input image signals of frames subsequent to the given frame, said subsequent input image signals corresponding to points neighboring each of said plurality of representative points within the motion vector detection area;
   a cumulative addition means, responsive to said subtraction means, for adding up the differences obtained by said subtraction means;
   a means for obtaining correlation values for discrete shifts of predetermined intervals IX and IY in the horizontal and vertical directions, respectively, within the motion vector detection area based on said differences added up by said cumulative addition means;
   a motion vector outputting means, responsive to said correlation values obtaining means, for determining a minimum value point (i', j') corresponding to a minimum value among said correlation values, interpolating the correlation values in accordance with an interpolation polynominal by using a correlation value $\Sigma|\Delta L|$ between the minimum value point and points neighboring the minimum value point, and outputting, as a motion vector, a minimum value point corresponding to a minimum value among the interpolated correlation values obtained in accordance with the interpolation polynominal; and
   wherein said low-pass filter means has a non-zero impulse response for at least one of a delay of said predetermined horizontal direction interval LX and a delay of said predetermined vertical direction interval LY with respect to said input image signals.

4. A motion vector detecting apparatus according to claim 3, further comprising a frequency divider means connected to said low-pass filter means for dividing a sampling frequency of the input image signals by a factor of 1/IX.

5. A motion vector detecting apparatus comprising:
   a low-pass filter means for receiving and filtering input image signals;
   a representative point memory means, receiving an output of said low-pass filter means, for storing image signals corresponding to a plurality of representative points arranged within a motion vector detection area for input image signals of a given frame, said representative points being arranged at a predetermined horizontal direction interval LX and at a predetermined vertical direction interval LY;
   a subtraction means, receiving stored image signals from said representative point memory means and the input image signals, for obtaining differences between (i) stored image signals stored in said representative point memory means corresponding to each of said plurality of representative points and (ii) input image signals of frames subsequent to the given frame, said subsequent input image signals corresponding to points neighboring each of said plurality of representative points within the motion vector detection area;

a cumulative addition means, responsive to said subtraction means, for adding up the differences obtained by said subtraction means;

a means for obtaining correlation values for discrete shifts of predetermined intervals IX and IY in the horizontal and vertical directions, respectively, within the motion vector detection area based on said differences added up by said cumulative addition means;

a motion vector outputting means, responsive to said correlation values obtaining means, for determining a minimum value point (i', j') corresponding to a minimum value among said correlation values, obtaining a shift quantity (dx, dy) in accordance with the following equations by using a correlation value $\Sigma|\Delta L|$ between the minimum value point and four neighboring points in the horizontal and vertical directions of the minimum value point, and outputting, as a motion vector, a value obtained by further adding the shift quantity (dx, dy) to the minimum value point (i', j'), where the equations include $$dx = (IX/2) \times (a - b)/\max(a,b)$$
$$dy = (IY/2) \times (c - d)/\max(c,d)$$
where
$$a = \Sigma|\Delta L|(i' - IX, j') - \Sigma|\Delta L|(i',j')$$
$$b = \Sigma|\Delta L|(i' + IX, j') - \Sigma|\Delta L|(i',j')$$
$$c = \Sigma|\Delta L|(i', j' - IY) - \Sigma|\Delta L|(i',j')$$
$$d = \Sigma|\Delta L|(i', j' + IY) - \Sigma|\Delta L|(i',j').$$

and wherein said low-pass filter has a non-zero impulse response for at least one of a delay of said predetermined horizontal direction interval LX and a delay of said predetermined vertical direction interval LY with respect to said input image signals.

* * * * *